April 14, 1959 M. KURSH 2,881,913

PHONOGRAPH RECORD HOLDER

Filed Aug. 19, 1957 2 Sheets-Sheet 1

INVENTOR.

Maurice Kursh

BY Jack M. Weiseman

ATTORNEY

April 14, 1959 M. KURSH 2,881,913

PHONOGRAPH RECORD HOLDER

Filed Aug. 19, 1957 2 Sheets-Sheet 2

INVENTOR.
Maurice Kursh
BY
Jack M. Wiseman
ATTORNEY 2,881,913

PHONOGRAPH RECORD HOLDER

Maurice Kursh, Palo Alto, Calif.

Application August 19, 1957, Serial No. 678,781

9 Claims. (Cl. 206—62)

The present invention appertains in general to containers for articles, and more particularly to a holder for a phonograph disc record.

At the present time, it is of common practice to store a phonograph record in a cardboard sheath. Through repeated handling, the conventional sheath becomes worn and deteriorates to the point where it does not afford adequate protection to the record. In those instances where an inner protective wrapper is provided to keep the record adequately protected, the record so contained is difficult either to remove from the record holder or to insert into the record holder.

Accordingly, an object of the present invention is to provide an article holder that completely encloses an article and yet permits the article to be inserted therein or removed therefrom with facility.

Another object is to provide a record holder that has relatively movable inner and outer cases for completely enclosing a record contained by the holder.

Another object is to provide a telescoping record holder wherein an inner case opens and closes automatically.

Another object is to provide a record holder having a record-containing jacket that folds from a record-enclosing position as it is withdrawn from a sheath and unfolds into the record-enclosing position as it is moved into the sheath.

Another object is to provide a record holder having an inner case that folds automatically from a record-enclosing position as it is withdrawn from an outer case in a continuous movement and unfolds automatically into a record-enclosing position as it is advanced into the outer case in a continuous movement.

Other objects will appear upon perusal of the detailed description taken in conjunction with the accompanying drawings, in which.

Figure 1:
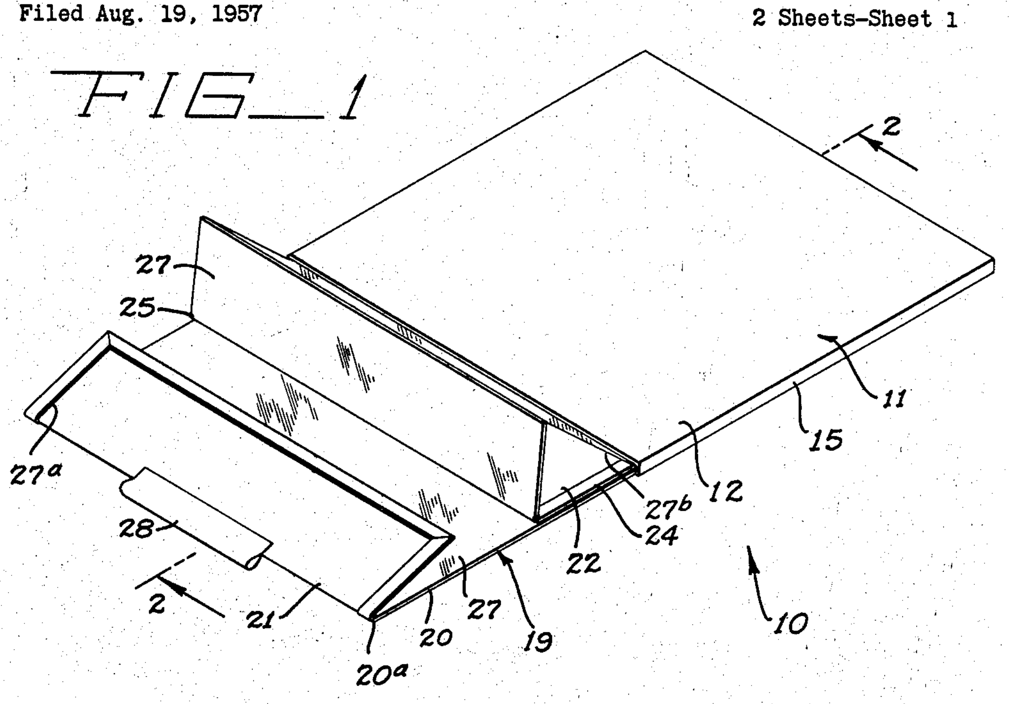
Fig. 1 is a perspective view of the phonograph record holder of the present invention illustrating the inner case thereof withdrawn from the outer case and showing a flap of the inner case folded from the record-enclosing position.
Figures 2, 3:
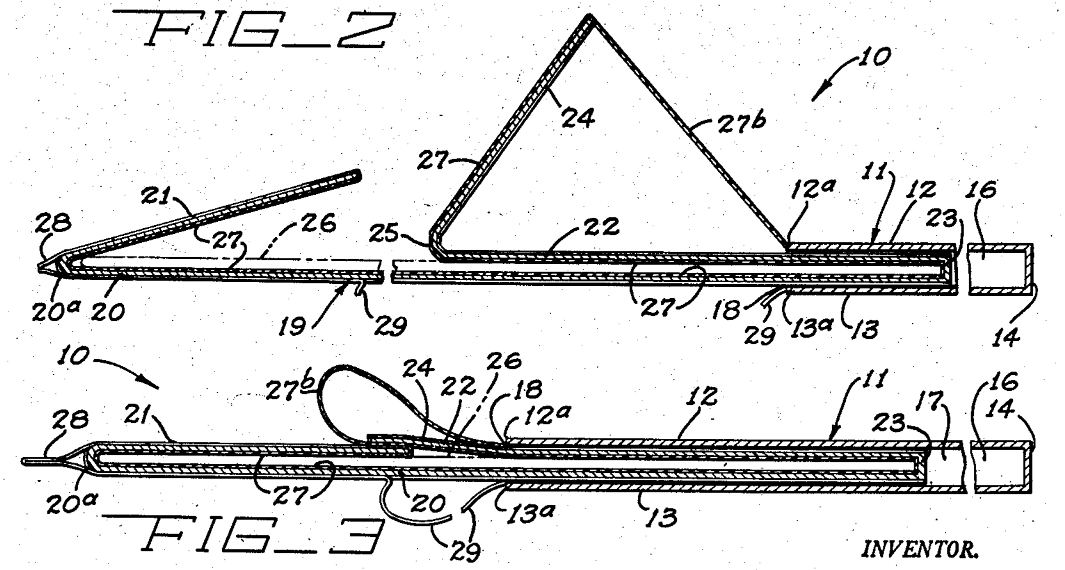
Fig. 2 is a fragmentary vertical section taken along line 2—2 of Fig. 1.
Fig. 3 is a vertical section similar to Fig. 2, but showing the inner case partially inserted into the outer case with flaps thereof in the record-enclosing position.

In Figs. 1–3, inclusive, the record holder 10 of the present invention is illustrated as comprising a rigid cardboard cover or outer case 11 in the form of a sheath, which comprises spaced, flat body members 12 and 13 interconnected along three edges by rear wall 14 and side walls 15 and 16. A chamber 17 is formed by the body members 12 and 13 and the walls 14, 15 and 16, which chamber has an open end 18 defined by the free edges 12*a* and 13*a* of the body members 12 and 13, respectively.

The record holder 10 also comprises an inner case or disc-receiving jacket 19, which is movable within the chamber 17, and, hence the inner case 19 is movable in telescopic relation with the outer case 11. Included in the inner case 19 is a cardboard base member 20 having a flap 21 foldable about a fold line or hinge 20*a* that is disposed in parallel relation with the free edges 12*a* and 13*a* of the outer case 11. The flap 21 is adapted to be folded in superposed relation to the base member 20 and to be unfolded to an extended position in planar alignment with the base member 20.

Superposed on the base member 20 of the inner case is a foldable cardboard body member 22 which is connected to the base member by a rear wall 23 that is movable in the chamber 17 in spaced parallel relation with the rear wall 14 of the outer case 11. A suitable adhesive tape may be used to fixedly secure the base member 20 and the body member 22 to the rear wall 23. When the inner case 19 is fully inserted within the outer case 11, the rear wall 23 is adjacent the rear wall 14. The body member 22 comprises at the free end thereof a flexible portion or flap 24, which is foldable about a hinge or fold line 25 that is intermediate the front and rear edges of the body member 22 and which is disposed in spaced parallel relation with the fold line 20*a* of the base member 20. The flap 24 is adapted to be folded to an angularly disposed relation with its adjacent portion of the body member 22 (Fig. 2) and to be unfolded into overlapping relation with the flap 21, when the flap 21 is in a folded position (Fig. 3).

In the preferred embodiment, the base member 20 is of suitable dimension so as to be adaptable to support a disc record 26 on the upper surface thereof between the fold line 20*a* and the rear wall 23 as indicated in Figs. 2 and 3. It is within the contemplation of the present invention that the inner case 19, which includes base member 20 and its flap 21, body member 22 and its flap 24, and rear wall 23, may be integrally formed.

From the foregoing it is to be observed that the disc record 26 is placed with its lower surface upon the base member 20 with diametrically opposite parts of its peripheral edge adjacent the fold line 20*a* and the rear wall 23, respectively. By folding the flap 21 onto the upper surface of the disc record 26 and then overlapping the flap 24 onto the flap 21 (Fig. 3), the record 26 is fully enclosed within the jacket 19.

For protecting the record 26 against scratches and other frictional markings, when enclosed within the jacket 19, all inner surfaces that may come into contact with the record 26 are lined with a suitable soft, flexible plastic material such as vinyl lining 27. The marginal edges 27*a* of the vinyl lining 27 are fixed to the outer surfaces of the base member 20 and the body member 22 by a suitable adhesive material. Hence, the inner surfaces of the jacket 19 are lined smoothly. It is to be noted that the vinyl lining 27 is in even contact with the inner surfaces of the base member 20 including the flap 21 and the inner surfaces of the body member 22 including the flap 24.

The flap 24 automatically folds or flexes upwardly along the fold line 25 when the inner case 19 is withdrawn from the outer case 11. This is accomplished by an extension 27*b* of the vinyl lining 27 that projects over and beyond the overlapping edge of the flap 24. The extension 27*b* passes through the open end 18 of the outer case 11 and is fixedly secured to the body member 12 of the outer case 11 along the entire width thereof. When the inner case 19 is initially moved outwardly from the chamber 17 (Fig. 3), the flap 24 remains substantially in planar alignment with the remainder of the body member 22 until slack in the extension 27*b* is taken up upon continued withdrawing movement of the inner case 19 from the outer case 11. Upon further withdrawing movement, the tightened extension 27*b* pulls the flap 24 upwardly in pivotal movement about the fold line 25 and away from the record 26 until the flap 24 has been pivoted through an angular displacement greater than ninety degrees (Fig. 2), thus exposing part of the contained record to view. Hence, it may be seen that the inner case 19 can be withdrawn from the outer case 11 in a single, continuous sliding movement, during which the flap 24 is automatically raised from the record-enclosing position by the action of the lining extension 27*b*. While the preferred embodiment utilizes the extension 27*b* of the vinyl lining 27 to pull the flap 24 upward from the record 26 automatically, it is to be understood that a flexible ribbon, tape, or other similar material can be used in a like manner.

The flap 24 also closes automatically into a record-enclosing position when the inner case 19 is returned to its fully enclosed position within the outer case 11. When the inner case 19 is in its outermost position, the extension 27*b* is taut (Fig. 2). By telescoping the inner case 19 into the outer case 11, the extension 27*b* is urged into flat, even contact with the upper surface of the flap 24. This permits the flap 24 to lower. With further continued movement of the inner case 19 into the outer case 11, the edge 12*a* of the outer case 11 forces the flap 24 into a fully lowered position. During this time the extension 27*b* doubles over itself until the fold line 25 reaches the edge 12*a*. As the inner case 19 is further inserted into the chamber 17, the extension 27*b* unfolds between the outer surface of the flap 21 and the inner surface of the body member 12, since the end thereof secured to the flap 24 travels with the inner case 19. When the inner case is fully inserted within the outer case 11, the extension 27*b* is interposed between the entire outer surface of the flap 21 and the inner surface of the body member 12 of the outer case 11 and thus is entirely contained within the outer case 11.

To facilitate the removal of the inner case 19 from the outer case 11, a suitable tab 28 is secured to the inner case 19 at the fold line 20*a*. For limiting the outward movement of the inner case 19 from the outer case 11, a suitable strip of tape 29 is secured to the under surface of the base member 20 of the inner case 19 and to the upper surface of the body member 13 of the outer case 11. When the inner case 19 is fully extended from the outer case 11, the tape 29 is in even contact with the lower surface of the base member 20, and when the inner case 19 is telescoped into the outer case 11, the tape 29 is interposed between the base member 20 of the inner case 19 and the body member 13 of the outer case 11.

In the use of the phonograph disc record holder 10, the inner case 19 is withdrawn from the outer case 11 in a smooth, uninterrupted movement, until the limit determined by the tape 29 is attained. As this occurs, the flap 24 is automatically opened or folded upwardly as hereinabove explained. To store the record 26 within the holder 10, the record 26 is placed on the base member 20 and the flap 21 is folded onto the upper surface of the record 26. Thereupon the record is urged toward the chamber 17 with its lower surface gliding along the upper surface of the base member 20 until the movement of the record 26 is arrested by the rear wall 23 of the inner case 19. At this time, the flap 21 is folded over the record 26. The inner case 19 is thereupon pushed into the outer case 11 and the flap 24 is automatically returned to an overlapping relation with the flap 21. This completely encloses the record 26 within the jacket 19 in the manner previously described in detail.

To remove the record 26 from the holder 10, the tab 28 is gripped to withdraw the inner case 19 from the chamber 17 to the limit permitted by the tape 29. The continuous outward movement of the inner case 19 from the outer case 11 causes the flap 24 to rise automatically from the record 26 (Fig. 2) in the manner above described. When the inner case 19 reaches its maximum outward movement, the flap 21 may be unfolded away from the record 26. Thereupon, the record 26 may be grasped at the peripheral edge thereof and removed from the jacket 19 by a gliding movement along the upper surfaces of the base member 20 and the flap 21.

Figure 4:
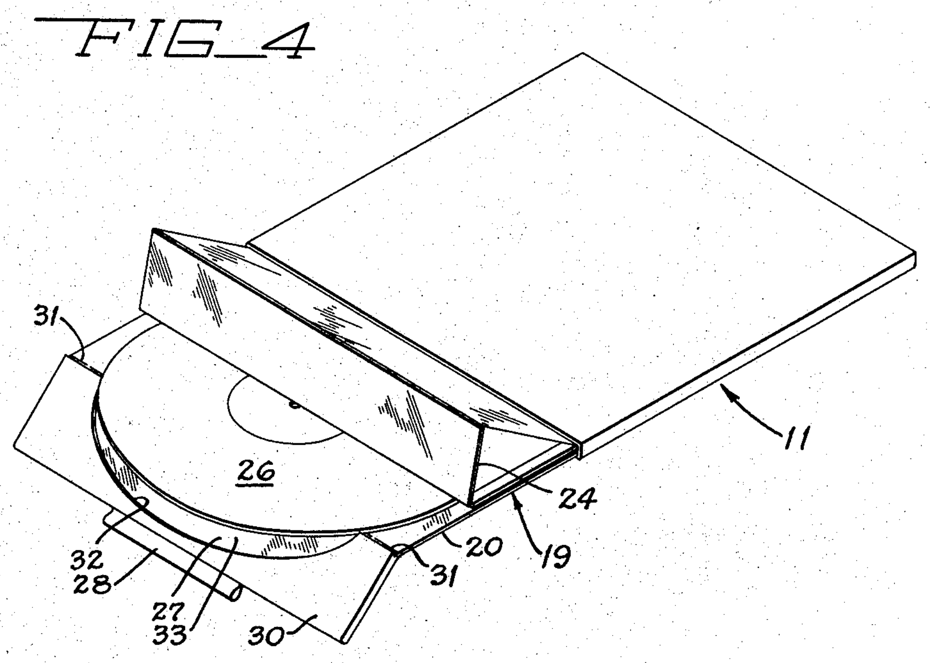
Fig. 4 is a perspective view of a modification of the record holder illustrating a flap of the inner case folded from a record-enclosing position and also showing a recessed area for the inner case having a wall conforming to the contour of a portion of the peripheral edge of a record for nesting the record.

In the modification of the invention illustrated in Fig. 4, the outer case 11 is constructed and arranged in the manner shown in Figs. 1–3, inclusive. However, the inner case 19 is modified to the extent that a record-locating member 30 and a score or fold line 31 is provided in lieu of the flap 21 and the hinge 20*a*. The record-locating member 30 is superposed on the base member 20 in fixed relation therewith adjacent the tab 28. It is to be observed that a portion of the vinyl lining 27 is interposed between the base member 20 and the record-locating member 30, and the tab 28 has a portion thereof fixed to the record-locating member 30. The outer edges of the record-locating member 30 are aligned with the outer edges of the base member 20. An inner arcuate abutment wall 32 is formed in the record-locating member 30 and has a contour conforming to the contour of a portion of the peripheral edge of the record 26. The height of the wall 32 may be slightly greater than the thickness of the record 26. Thus, a recess is formed by the record-locating member 30 and a portion of the base member 20 for nesting the record 26 in a predetermined position on the base member 20.

Adjacent the terminal portions of the abutment wall 32 and extending generally parallel with the hinge 25 is the score or fold line 31, which is formed on the base member 20. When the flap 24 is in planar alignment with the remainder of the body member 22, the score line 31 is adjacent the distal edge of the flap 24. The fold line 31 enables the portion of the base member 20 forming the recessed area 33 to be flexed away from the record 26. Since the record-locating member 30 is fixed to that portion of the base member 20 forming the recessed area 33, flexing of the base member 20 causes a corresponding movement of the record-locating member 30. In this manner, the peripheral edge of the record 26 can be gripped with ease when removing the record 26 from the base member 20 of the inner case 19, and, also, the placement of the record 26 on the base member 20 of the inner case 19 is facilitated.

In the use of the phonograph disc record holder illustrated in Fig. 4, the inner case 19 is withdrawn from the outer case 11 until further movement is arrested by the tape 29. As this occurs, the flap 24 is automatically opened or folded upwardly in a manner hereinbefore explained. To store the record 26 within the record holder, the portion of the base member 20 forming the recess 33 is flexed downwardly along the score line 31. This action causes an angular displacement of the record-locating member 30. The record 26 is placed on the base member 20 and urged toward the chamber 17 with its lower surface gliding along the upper surface of the base member 20 until the movement of the record 26 is arrested by the rear wall 23 of the inner case 19. At this time, the flexed portion of the body member 20 is returned in planar alignment with the remainder of the body member 20 and the record 26 is received by the recess 33 in abutting relation with the wall 32 of the record-locating member 30. The inner case 19 is thereupon pushed into the outer case 11 and the flap 24 is automatically unfolded into record-enclosing position. Hence, the record 26 is completely enclosed within the jacket 19.

To remove the record 26 from the holder 10, the tab 28 is gripped to withdraw the inner case 19 from the chamber 17 to the limit permitted by the tape 29. The continuous outward movement of the inner case 19 from the outer case 11 causes the flap 24 to rise automatically from the record 26 in the manner above described. After the inner case 19 reaches its maximum outward movement, the portion of the base member 20 forming the recess 33 is flexed about the score line 31 away from the record 26. The flexing of the base member 20 about the score line 31 angularly displaces the record-locating member 30 away from the record 26. Thereupon, the record 26 may be grasped at the peripheral edge thereof and removed from the jacket 19 by a gliding movement along the upper surface of the base member 20.

Figure 5:
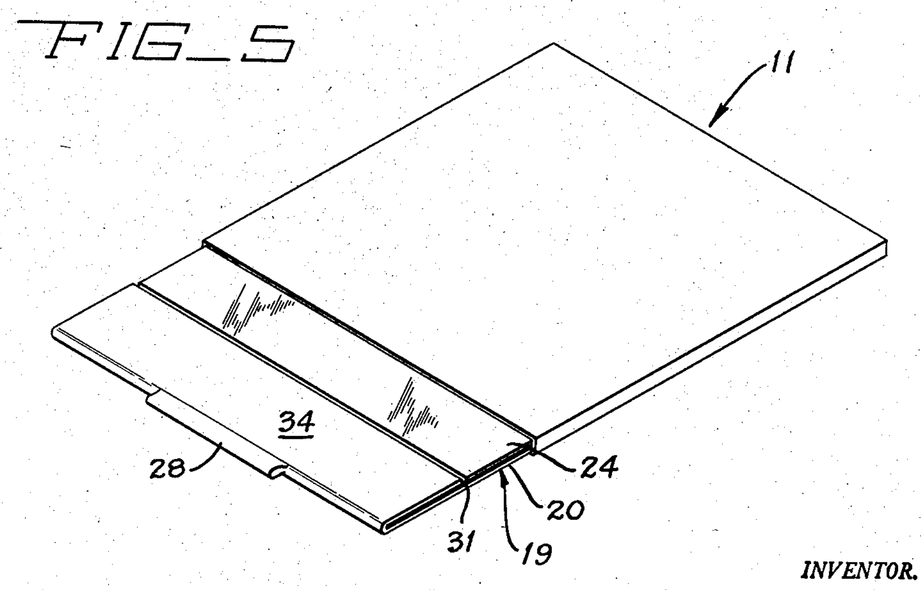
Fig. 5 is a perspective view of another modification of the record holder illustrating the flaps of the inner case in juxtaposition instead of overlapping.

Another modification of the present invention is illustrated in Fig. 5. In this modification, the outer case 11 is constructed and arranged in the manner shown in Figs. 1–3, inclusive. However, the inner case 19 (as illustrated in Figs. 1–3, inclusive) is modified only to the extent that a flap 34 (Fig. 5) is provided in lieu of the flap 21 (Figs. 1–3, inclusive). The flap 34 is so constructed and arranged that its distal edge, when folded into a record-enclosing position, is in juxtaposition or contiguous to the distal edge of the flap 24, when the flap 24 is in planar alignment with the remainder of the body member 22. The use and operation of the record holder illustrated in Fig. 5 is similar to that of the record holder shown in Figs. 1–3, inclusive, with the exception that there is no overlapping relation between the flaps of the inner case 19.

Whereas, the holder of the present invention has been described as a phonograph record holder, it is to be understood that the inventive concept is applicable to other article holders such as a reel holder or a disc holder.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. A disc holder comprising an outer case having a chamber therein, a base member received by said chamber for relative movement with said outer case and adapted for supporting a disc thereon, a spacer member superposed on said base member in fixed relation therewith to form a recess for nesting a portion of the disc supported by said base, a body member superposed on said base member in fixed relation therewith to form a disc-containing pocket, said body member including a flap foldable into a disc-enclosing position, and a flexible lining in fixed relation with inner surfaces of said base and body members and having a free end extending beyond said flap and fixed to said outer case, said free end being dimensioned so as to be drawn taut when said body and base members are withdrawn from said chamber to automatically turn said flap from its disc-enclosing position, said flap being automatically foldable into the disc-enclosing position in response to movement of said body and base members into said chamber.

2. A disc holder comprising an outer case having a chamber therein, a base member received by said chamber for relative movement with said outer case and adapted for supporting a disc thereon, a spacer member superposed on said base member in fixed relation therewith for forming a recess and having a wall conforming to the contour of a portion of the peripheral edge of the disc for nesting the disc in a predetermined location on said base member, a body member superposed on said base member in fixed relation therewith to form a disc-containing pocket, said body member including a flap foldable into a disc-enclosing position, and a flexible lining in fixed relation with inner surfaces of said base and body members and having a free end extending beyond said flap and fixed to said outer case, said free end being dimensioned so as to be drawn taut when said body and base members are withdrawn from said chamber to turn said flap from its disc-enclosing position, said flap being automatically foldable into the disc-enclosing position in response to movement of said body and base members into said chamber.

3. A disc holder comprising an outer case having a chamber therein, a base member received by said chamber for relative movement with said outer case and adapted for supporting a disc thereon, a spaced member superposed on said base member in fixed relation therewith for forming a recess and having a wall conforming to the contour of a portion of the peripheral edge of the disc for nesting the disc in a predetermined location on said base member, a body member superposed on said base member in fixed relation therewith to form a disc-containing pocket, said body member including a flap foldable into a disc-enclosing position, a flexible lining in fixed relation with inner surfaces of said base and body members and having a free end extending beyond said flap and fixed to said outer case, said free end being dimensioned so as to be drawn taut when said body and base members are withdrawn from said chamber to automatically turn said flap from its disc-enclosing position, said flap being automatically foldable into the disc-enclosing position in response to movement of said body and base members into said chamber, and a fold line on said base member adjacent the terminal portions of the wall of said spacer member for flexing a portion of said base member forming the recessed area away from the disc, thereby angularly displacing said spacer member for facilitating the removal of the disc from said base member.

4. A disc holder comprising an outer case having a chamber therein, a base member received by said chamber for relative movement with said outer case and adapted for supporting a disc thereon, a spacer member superposed on said base member in fixed relation therewith for forming a recess for nesting the disc in a predetermined position on said base member, a body member superposed on said base member in fixed relation therewith to form a disc-containing pocket, said body member including a flap foldable into a disc-enclosing position, a flexible lining in fixed relation with inner surfaces of said base and body members and having a free end extending beyond said flap and fixed to said outer case, said free end being dimensioned so as to be drawn taut when said body and base members are withdrawn from said chamber to automatically turn said flap from its disc-enclosing position, said flap being automatically foldable into the disc-enclosing position in response to movement of said body and base members into said chamber, and a fold line on said base member adjacent said spacer member for flexing a portion of said base member forming the recessed area away from the disc, thereby angularly displacing said spacer member for facilitating the removal of the disc from said base member.

5. An article holder comprising a sheath, an article containing jacket telescopically received by said sheath, said jacket including a flexible section movable from an article-enclosing position, and a lining secured to inner surfaces of said jacket for protecting an article received by said jacket, said lining including a portion projecting beyond said flexible section and secured to said sheath, said projecting portion being dimensioned so as to be drawn taut when said jacket is withdrawn from said sheath to displace said flexible section from its article-enclosing position.

6. An article holder comprising an outer case having an open end, an inner case received by said outer case for movement through said open end, said inner case including a foldable section pivotal about a fold line in parallel relation with said open end, and a flexible lining secured to inner surfaces of said inner case in uniform contact therewith for protecting an article received by said inner case, said lining including a portion projecting beyond the distal edge of said foldable section and being secured to said outer case, said projecting portion being dimensioned so as to be drawn taut when said inner case is withdrawn from said outer case to automatically pivot said foldable section.

7. An article holder comprising a sheath having opposed body members terminating at an open end of said sheath, a jacket slidable within said sheath for movement relative thereto through said open end, said jacket including a section alternately foldable to and from an article-enclosing position about a fold line parallel to said open end, and a flexible lining secured to inner surfaces of said jacket in uniform contact therewith for protecting an article received by said jacket, said lining including an extension projecting beyond said foldable section and secured to one of said body members, said extension being dimensioned so as to be drawn taut when said jacket is withdrawn from said sheath to pull said foldable section from its article-enclosing position, said section being engageable with an edge of one of said body members as the jacket moves inward of the sheath to return said section to its article-enclosing position, said extension being pulled into said jacket as said jacket moves inward of said sheath.

8. An article holder comprising an outer case having a chamber therein, a base member received by said chamber for relative movement with said outer case and adapted for supporting an article thereon, said base member including a flap foldiable toward said chamber into an article-enclosing position, a body member superposed on said base member in fixed relation therewith to form an article-containing jacket, said body member including a section foldable toward said flap in overlying relation therewith for enclosing an article within the jacket, and a flexible lining secured to inner surfaces of said base and body members for protecting an article received by said jacket, said lining having a free end extending beyond said foldable section and fixed to said outer case, said free end being dimensioned so as to be drawn taut when said body and base members are withdrawn from said chamber for automatically turning said foldable section from its article-enclosing position, said foldable section being automatically foldable into the article-enclosing position in response to movement of said body and base members into said chamber.

9. An article holder comprising an outer case having a chamber therein, a base member received by said chamber for relative movement with said outer case and adapted for supporting an article thereon, said base member including a flap foldable toward said chamber into an article-enclosing position, a body member superposed on said base member in fixed relation therewith to form an article-containing jacket, said body member including a section foldable toward said flap so that its distal edge is contiguous to the distal edge of said flap when said flap is in the article-enclosing position for enclosing an article within the jacket, and a flexible lining secured to inner surfaces of said base and body members in uniform contact therewith for protecting an article received by said jacket, said lining having a free end extending beyond said foldable section and fixed to said outer case, said free end being dimensioned so as to be drawn taut when said body and base members are withdrawn from said chamber to turn said foldable section from its article-enclosing position, said foldable section being automatically foldable into the article-enclosing position in response to movement of said body and base members into said chamber.

References Cited in the file of this patent

UNITED STATES PATENTS 475,918 Barker ---------------- May 31, 1892

FOREIGN PATENTS 14,144 Great Britain -------------------- 1888
940,214 France ---------------- May 10, 1948